United States Patent [19]

Smith

[11] Patent Number: 4,552,073

[45] Date of Patent: Nov. 12, 1985

[54] SUSPENDED LOAD TRANSPORT APPARATUS

[75] Inventor: Glenn S. Smith, Issaquah, Wash.

[73] Assignee: Beebe International, Inc., Seattle, Wash.

[21] Appl. No.: 582,965

[22] Filed: Feb. 23, 1984

[51] Int. Cl.⁴ .............................................. B61B 3/00
[52] U.S. Cl. ....................................... 105/154; 16/98;
    16/DIG. 36; 104/95; 105/148; 384/558
[58] Field of Search ...................... 105/148, 154, 155;
    104/89, 94, 95; 198/845; 16/97, 98, 102, 107,
    DIG. 36; 384/495, 558

[56] References Cited

U.S. PATENT DOCUMENTS

| | | |
|---|---|---|
| 667,868 | 2/1901 | Cook . |
| 1,429,118 | 9/1922 | Townsend . |
| 1,652,009 | 12/1927 | Hoffmaster . |
| 2,611,326 | 9/1952 | Smallpiece .......................... 105/154 |
| 2,997,966 | 8/1961 | Chapin et al. ....................... 105/163 |
| 3,971,601 | 7/1976 | Sytsma ................................ 308/16 |
| 4,178,856 | 12/1979 | Dunville ............................. 104/95 |
| 4,266,657 | 5/1981 | Frost et al. ......................... 198/687 |

Primary Examiner—Randolph A. Reese
Attorney, Agent, or Firm—Christensen, O'Connor, Johnson & Kindness

[57] ABSTRACT

A monorail carriage for use with H-beams wherein carriage rollers mounted on frame-cantilevered shafts remain in continuing full-length running engagement with the monorail beam flanges throughout varying downward load deflection of such flanges. Rockable roller bearing elements at opposite ends of each roller include one which is spring loaded so as to force translation or displacement of the roller in response to flange deflection so as to maintain such full-length contact of the roller with the beam flange, although with attendant shift of the center of pressure lengthwise of the roller on the track flange.

10 Claims, 8 Drawing Figures

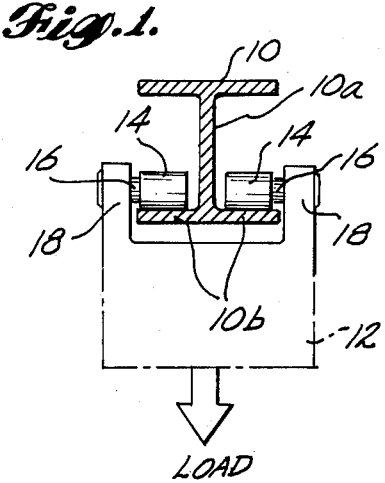
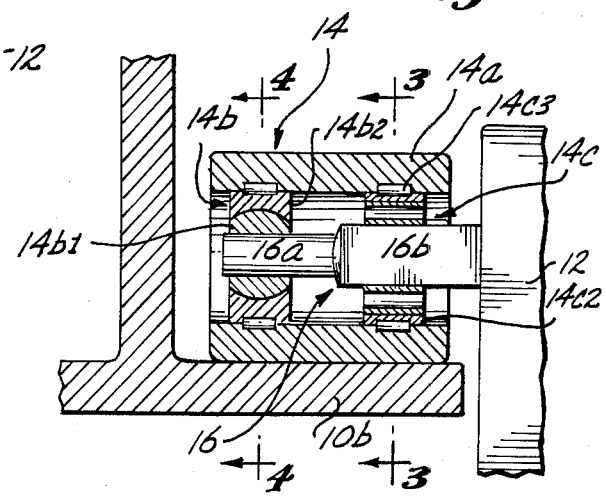
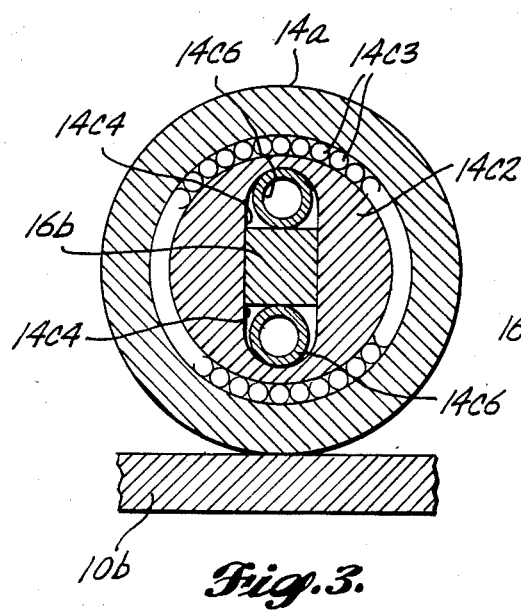
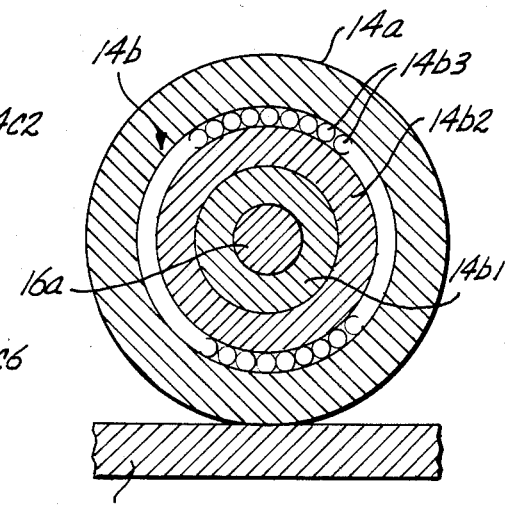

SUSPENDED LOAD TRANSPORT APPARATUS

BACKGROUND OF THE INVENTION

This invention relates to improved monorail crane trucks or carriages and is herein illustratively described by reference to its presently preferred forms.

A number of proposals made over the years to improve the wear and stability characteristics of monorail crane carriages employed rollers tapered toward the monorail beam web and cantilevered on fixed, opposing horizontal shafts projecting in coalignment toward each other from opposite sides of a carriage frame yoke. Matching the taper of the rollers with the slope of the beam flange surface placed their full lengths in rolling contact with the track surfaces. Examples are found in U.S. Pat. Nos. 4,266,657 (Frost et al.); 3,971,601 (Sytsma); 4,178,856 (Dunville); 1,652,009 (Hoffmaster); and 667,868 (Cook). This was seen to be desirable as a means of stabilizing the carriage against rocking and slewing. For example, without such stabilization, offset of the crane's center of mass, or shifting of the center of mass back and forth laterally in relation to the vertical plane of the monorail beam web, could cause the carriage to rock back and forth on the track and to experience skips or intermittency in crane drive roller traction.

However, tapered roller construction has proved to be less than a satisfactory design concept because of the scouring and wear of tread and roller surfaces resulting from the inherent differential in surface speeds of the rollers along their lengths. Furthermore, application of heavy loads to the crane carriage deflecting the monorail beam track flanges downwardly caused a relatively abrupt transition from the desired stabilizing full-length, rolling contact of the roller surfaces with the flange surfaces to a zonal or line-contact condition wherein, at high loading, substantially the full weight was borne by the inner ends or tips, of the rollers adjacent to the sides of the central beam web. This led to aggravated lateral instability along with aggravated localized wear of rollers and track (beam flange) surfaces. In addition, the asymmetrical loading of bearings supporting the rollers on their respective shafts shortened bearing life.

The alternative of employing untapered, cylindrical rollers mounted on cantilevered roller shafts, in turn mounted at an incline matching the slopes of the monorail beam flange bearing surfaces, reduced the no-load and light-load scouring and wear effects mentioned above, but represented no solution to the remaining problems just described. U.S. Pat. No. 1,429,118 (Townsend) illustrates that alternative type of carriage design.

Longitudinally convex rounding of the roller tread surfaces as in U.S. Pat. No. 2,997,966 (Chapin et al.) and 2,611,326 (Smallpeice) was also proposed as an alternative configuration apparently in an attempt to achieve reduced scouring and wear effects as mentioned above and also wear distribution by progressive shifting of the contact pressure zones of the rollers back and forth on the beam flanges as a function of changing flange deflection with varying loads. However, the narrow lines or zones of running contact between the roller surfaces and the beam flanges still aggravated surface wear and contributed to carriage instability.

Costly hardening of beam flange surfaces to reduce track wear added unduly to the cost of an installation whether or not an I-beam or a wide flange I-beam was employed. Since wide flange I-beams, such as H-beams, are less expensive and more readily available than I-beams, attempts were made to use these. But, one again, the problem of aggravated wear with increasing load conditions, aggravated now by the greater flange width in relation to flange thickness, hence greater deflectability of the flanges under load, aggravated the wear and instability problems. Reinforcement of the lower beam flange against load deflection by bottom paltes welded to the bottom face of the beam materially reduced flange deflection under load but added materially to installation cost.

An object of the present invention is to provide an improved monorail crane carriage of relatively lwo cost and one which mitigates or overcomes the problem limitations described above.

A more specific object hereof is to provide a crane carriage roller and mount system with reduced roller and track surface wear and with improved average lateral crane stability over a wide range of load conditions. At the same time, the invention provides a system of bearings for the crane rollers functioning to carry the loads and to transfer loads from the carriage shafts to the track surfaces with favorable distribution under varying conditions of loading of the carriage.

SUMMARY OF THE INVENTION

In accordance with this invention in its presently most preferred embodiment, load forces from the carriage are transmitted to cylindrical rollers from the carriage shafts through resiliently and angularly yieldable load-bearing means at the outer ends of the rollers, i.e., the ends remote from the beam web. At their inner, opposite ends, that is, at their ends adjacent the beam web, the rollers carry shaft loading through interposed roller bearings designed to accommodate angular changes between the roller axis and the associated shaft axis. As a result, while there is a shift along each roller of the median transverse plane of the effective center of load pressure applied by the roller to the flange track surface as a function of changing flange deflection under varying load, the roller continues to bear over substantially its full length on the track surface at all loads so as to maximize carriage stability, and, to a substantial degree, distribute roller surface and tread surface wear over the maximum area. Thus, even at maximum load deflection of the beam flanges, the resilient follow-up, downward pressure on the outer ends of the rollers with attendant rocker action of the outer-end bearing means and the attendant accommodative rocker action of the otherwise rigidly supportive bearing means at the inner ends of the rollers maintain the roller surface in full-length contact with the deflected beam flanges while the cantilevered roller-supported shafts themselves remain substantially coaligned and undeflected. By selecting an appropriately high-spring constant in the resiliently deflectable load bearing means interposed between the outer end portions of the rollers and their associated carriage shafts, the longitudinal positioning of the effective centers of load pressure on the roller tread surfaces, while shifting with load variations, remains located between the ends of the rollers with attendant benefits in terms of carriage stability and minimum localization of tread surface and flange surface wear.

These and other features, objects and advantages of the invention will become more fully evident as the description proceeds by reference to the accompanying drawings.

BRIEF DESCRIPTION OF THE DRAWINGS

FIG. 1 is a simplified end sectional view of an H-beam monorail carriage track and monorail carriage mounted on the same.

FIG. 2 is an enlarged sectional end view of the lower portion of a monorail H-beam showing one of the track flanges engaged by a carriage roller formed in accordance with the most preferred embodiment of this invention.

FIG. 3 is a transverse sectional view taken on line 3—3 in FIG. 2.

FIG. 4 is a transverse sectional view taken on line 4—4 in FIG. 2.

FIG. 7 is a sectional end view similar to FIG. 5 illustrating an alternative embodiment, while

DETAILED DESCRIPTION REFERENCED TO THE DRAWINGS

Figure 5:
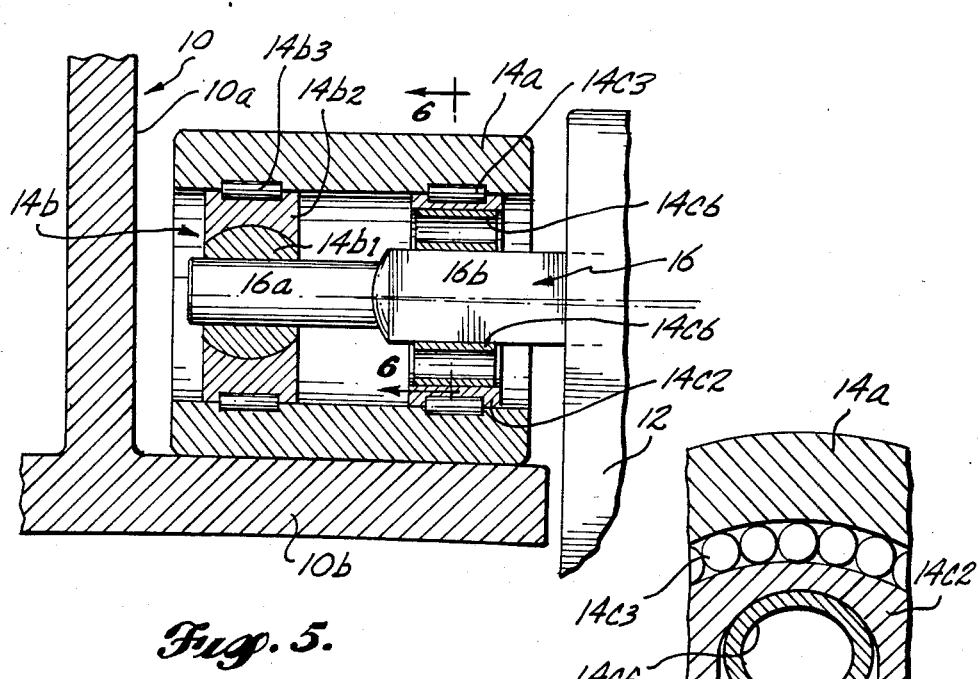
FIG. 5 is an enlarged operating sectional end view corresponding to that of FIG. 2 illustrating, albeit with exaggeration, the effect of increased laoding causing beam flange deflection and roller positionally accommodative self-adjustment associated therewith.
Figure 6:
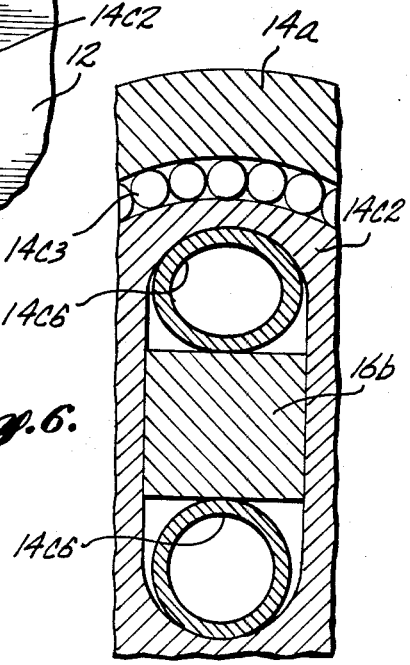
FIG. 6 is an enlarged fragmentary sectional view taken on line 6—6 in FIG. 5.

As depicted in FIG. 1, the monorail track 10 for crane carriage 12 has H-beam design characteristics, meaning two sets of parallel flanges (upper and lower) interconnected by an upright web at right angles to the flanges and an overall beam height substantially equal to the overall beam width. In its illustration, the web 10a is approximately the same thickness as the lower set of flanges 10b which serve as tracks for the illustrated set of oppositely positioned carriage rollers 14. The latter are mounted on opposing cantilevered shafts 16 and supported substantially rigidly in axial coalignment by carriage arms 18. It will be recognized, of course, that two or more such pairs of rollers may be used in a single carriage to provide the necessary longitudinal carriage stability and load support distributed along the beam.

As shown in FIGS. 2-6, each roller 14 comprises an annular tread, cylindrical roller member 14a rotatively journaled on special antifriction roller bearings 14b and 14c, with the latter spaced lengthwise on the cantilevered support shaft 16 and, in effect, respectively supporting and being supported by inboard and outboard end portions of member 14a. Antifriction bearing 14b supporting the inner end of tread member 14a adjacent beam web 10a comprises coaxial annular inner and outer bearing ring members 14b1 14b2 respectively. These interengage by way of spherical contact surfaces permitting one to rock or tilt relative to the other. The inner bearing ring member 14b1 is fixed on the round projecting end portion 16a of shaft 16. Between tread member 14a and the outer bearing ring member 14b2 is a captive annular series of bearing rollers 14b3 held in circumferentially spaced relationship around the periphery of bearing ring member 14b2 and captured within opposing matching annular grooves in tread member 14a and the outer periphery of bearing ring member 14b2, as best illustrated in FIG. 4. These serve to provide antifriction support for tread member 14a on shaft 16 by way of the rocker bearing ring combination 14b1 and 14b2; also to maintain the cooperating parts fixed lengthwise of the shaft.

Antifriction bearing 14c supporting the outer end of tread member 14a remote from beam web 10a comprises a disk-like journal member 14c2 journalling the tread member 14a on captive bearing rollers 14c3 much the same as in the case of bearing 14b. However, there the specific similarity ends. Member 14c2 has a central flat-sided slot 14c4 through it. The correspondingly flat-sided base portion 16a of cantilevered shaft 16 passes slidably but snugly through this slot, as best illustrated in FIG. 3. The transverse upper and lower ends of slot 14c4 are preferably rounded forming with the respective flat top and bottom faces of the shaft portion 16b, chambers which retain nominally round upper and lower vertically compressive tubular spring members 14c6. Under no-load or slight-to-moderate load conditions the tubular spring members 14c6 are balanced under approximately compressional loading. As carriage load increases, and thereby deflects the beam flange 10b downward from the dashed line position illustrated in FIG. 5, the lowermost of the two precompressed tubular spring members 14c6 expands and thereby continues, although with reduced force, to press the outer end of tread member 14a against the flange tread surface. This is permitted by accommodative flattening of the upper of the tubular spring members 14c6. Tilting or rocking of the tread member 14a in the vertical plane of the central axis of shaft 16 accompanies such downward flange deflection under heavy loading and is permitted by the adaptive rocking of the two bearings 14b and 14c. Rocking of bearing 14c is permitted by the action depicted in FIG. 6 wherein the spring tubes are shown to be differentially expandable and compressible from one end to the other, and the sliding engagement between the flat sides of slot 14c4 and of shaft portion 16b permits that kind of relative motion along with pure translational motion perpendicular to the axis of cantilevered shaft 16.

In operation, therefore, it will be appreciated that under no-load or slight-load conditions the tread member 14a comprising the rolling surface member of roller 14 bears over its full length on the upper tread surface of horizontal beam flange 10b. Because the tread surface of member 14a is cylindrical (of constant radius over its length) and flange 10b is flat, configurational relationship provides the desired nonscouring, stabilizing bearing contact between the roller and the beam surface under such conditions. As load force applied to the carriage 12 increases, hence downward deflection of flange 10b, however, the tread member 14a accommodatively follows the tilt of the flange by itself in tilting or rocking in relation to the fixed horizontal axis of cantilevered shaft 16. While such roller action is accompanied by a progressive decrease in the percentage of total load borne by the outer bearing 14c in relation to that borne by the inner bearing 14b, nevertheless, the tread member 14a continues to remain in running engagement with the flange surface over the full length of the roller. This action is permitted due to the resilient yield of the tubular spring members 14c6 in the bearing 14c and by the accommodative tilting or rocking action of both bearings. Hence, while centering of bearing load shifts lengthwise of the bearing roller ring as a function of load variations, that center remains located more nearly centered between the ends than with prior devices, and material improvements are attained in tread or track life and with carriage stability using the relatively inexpensive and available H-beam as the monorail carriage support. Yet another advantage is that the inboard shift of the bearing load reduces the cantilever load on the H-beam flange, thus increasing the load-carrying capacity of the H-beam.

Figure 7:
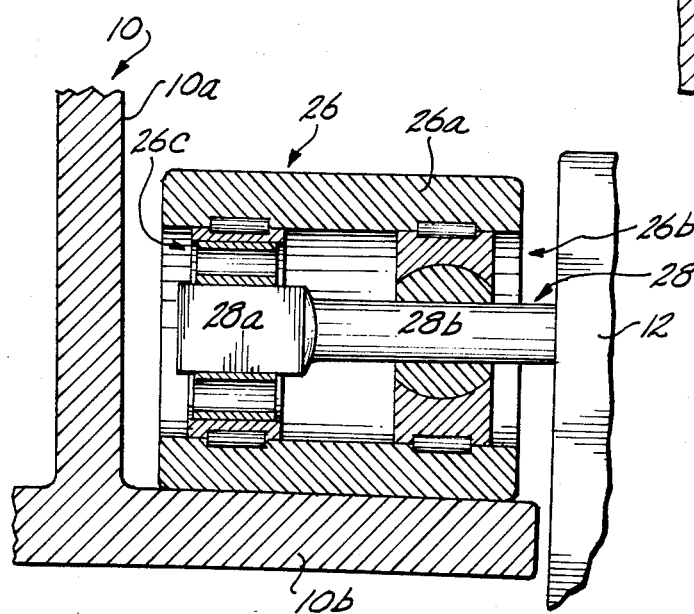

In FIG. 7 shaft configuration and the associated positioning of the two bearings is reversed in supporting the tread member 26a of roller 26. In this instance the projecting end portion 28a of the shaft 28 is the portion of rectangular or square cross-section, whereas the base portion 28b (most remote from the beam web) is round in cross-section. In this instance, antifriction, rocking, rigid bearing 26b is formed as the bearing 14b in the first-described embodiment. The antifriction, rocking, resiliently yieldable bearing 26c is formed as the bearing 14c in the first-described embodiment. Although the positions of these bearings supporting the tread ring 26a are reversed endwise of the shaft 28, their combined functions are effective to maintain the tread member 26a in rolling contact with the monorail beam flange 10b over substantially the full length of the tread member throughout the anticipated range of carriage loading. However, the arrangement is less favored due to the greater moment arm of load center applied to cause downward deflection of beam flange 10b with the rigid bearing 26b spaced farther from beam web 10a than in the prior embodiment.

In both such embodiments (FIGS. 2-6 and FIG. 7), the tread member 14a or 26a should be formed with at least limited capacity to flex under heavy loads such that beam flange deflection curvature, however slight it may be, it adaptively followed in the tread member's longitudinal line of bearing contact with the flange to the degree necessary to keep the roller in full-length engagement with the flange at all times.

Figure 8:
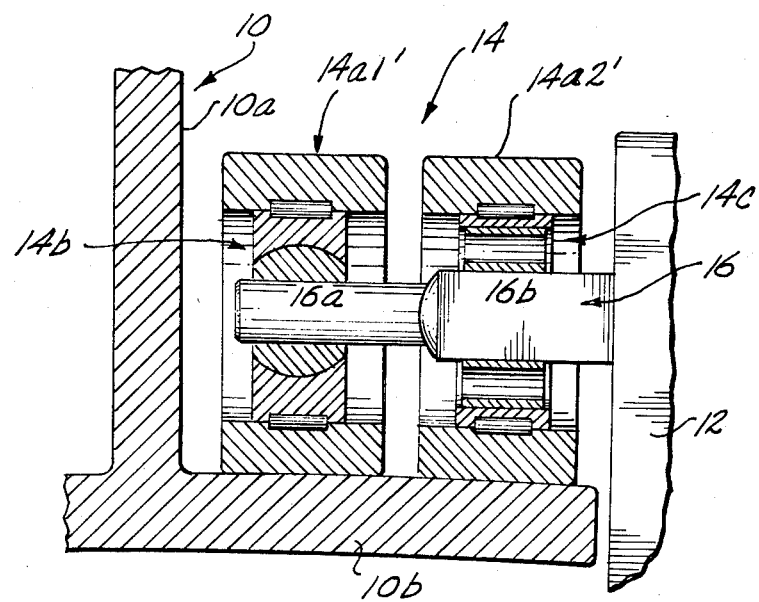
FIG. 8 is a sectional end view illustrating the self-adjustment action of the roller of still another alternative embodiment.

In the alternative embodiment shown in FIG. 8, the first-described embodiment appears with tread member 14' now formed in two separate parts 14a1' and 14a2' and the bearings associated with them. The part 14a1' is rotatively supported by bearing 14b and the part 14a2' by beraing 14c. In this modified configuration, improved uniformity of roller tread surface engagement with the beam flange 10b as a function is increasing flange deflection to the extent that downward flange deflection, particularly under heavy carriage loads, is accompanied by some curvature of the flange. An articulated roller tread member (14') is better enabled to retain uniformity of full-length tread surface engagement with the track flange curving than does a unitized roller tread member (14) to the extent the latter does not adaptively flex into a conforming curvature longitudinally along its line of track surface contact.

These and other aspects and modifications or variations in the practice of the invention are intended to be within the scope of the claims that follow.

The embodiments of the invention in which an exclusive property or privilege is claimed are defined as follows:

1. A monorail crane carriage adapted to run on the lower web-supported flanges of a generally horizontal H-beam, said carriage including a frame supported by and supporting load-bearing rollers mounted respectively on coaligned opposing support shafts which are frame-cantilevered to project inboard transversely in relation to the beam web, said rollers each comprising annular tread means with relatively inboard and outboard portions having cylindrical tread surfaces in running engagement with an H-beam lower flange, and separate antifriction bearing means for each roller rotatively supporting the respective inboard and outboard portions of said tread means on a shaft, one such separate bearing means comprising resiliently carriage load-compressed support means interposed between the associated tread means portion and the shaft permitting rocking of such tread means portion accompanied by translational yielding thereof in relation to the shaft for maintaining running contact with the flange of the tread surface of such portion over its full length as flange deflection changes with varying carriage load.

2. The carriage defined in claim 1, wherein the annular tread means of each roller comprises an integral annular member, including both said inboard and outboard tread means portions.

3. The carriage defined in claim 2, wherein the inboard and outboard tread means portions of each roller are separated lengthwise of the associated shaft.

4. The carriage defined in claims 1, 2 or 3, wherein said one bearing means has its support means interposed between the shaft and the outboard tread means portion.

5. The carriage defined in claims 1, 2 or 3, wherein said one bearing means has its support means interposed between the shaft and the outboard tread means portion, and wherein the other bearing means comprises universally pivotal support means interposed between the shaft and the inboard tread means portion and substantially unyieldable in translation in relation to the shaft.

6. The carriage defined in claims 1, 2 or 3, wherein said one bearing means has its support means interposed between the shaft and the outboard tread means portion, and wherein the other bearing means comprises universally pivotal support means interposed between the shaft and the inboard tread means portion and substantially permitting rocking of said inboard tread means but without yielding thereof in translation in relation to the shaft as flange deflection changes with varying carriage load.

7. The carriage defined in claim 4, wherein the resiliently carriage-load-compressed support means interposed between the associated tread means and the shaft comprises a journal member through which the shaft passes in transversely slidable nonrotative relationship permitting rocking of the journal member relative to and in a load plane containing the shaft axis and permitting translational movement of the member transverse to the shaft in such plane, said journal member being surrounded by and having means rotatively journalling the associated tread means portion thereon, and resiliently yieldable positioning means interposed between the shaft and said journal member yieldably maintaining the journal member at an intermediate rocked and translated position relative to the shaft with no load on the carriage and resiliently yielding to continue pressing the tread means portion against the beam flange with increasing carriage load and attendant increased flange deflection.

8. The carriage defined in claim 7, wherein the shaft has a flat-sided portion and the journal member has a complementary flat-sided slot slidably engaged by such flat-sided portion permitting such rocking and translational movement transverse to the shaft.

9. The carriage defined in claim 8, wherein the slot in the journal member accommodates the shaft portion intermediate opposite ends of the slot, and the resiliently yieldable positioning means comprise spring elements respectively interposed between opposite ends of the slot and said shaft portion.

10. The carriage defined in claim 9, wherein the spring elements comprise resiliently compressible tubular elements oriented in the slot for tubular cross sectional deformation by relative motion between such shaft portion and said journal member.

* * * * *